US007456988B2

(12) United States Patent  
Stevens et al.

(10) Patent No.: US 7,456,988 B2
(45) Date of Patent: Nov. 25, 2008

(54) CHANGING IMAGES IN DIGITAL-IMAGE SENDERS

(75) Inventors: Chad A. Stevens, Boise, ID (US); Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

(21) Appl. No.: 10/716,746

(22) Filed: Nov. 18, 2003

(65) Prior Publication Data

US 2005/0105133 A1    May 19, 2005

(51) Int. Cl.
G06K 1/00    (2006.01)
H04N 1/00    (2006.01)

(52) U.S. Cl. .................. 358/1.15; 358/407; 358/403; 358/402

(58) Field of Classification Search ............. 358/1.15, 358/407, 403, 402, 474; 709/206; 379/100.09, 379/100.08
See application file for complete search history.

(56) References Cited

U.S. PATENT DOCUMENTS

| 5,115,326 | A | 5/1992 | Burgess et al. |
| 5,299,018 | A | 3/1994 | Jeffersopn |
| 5,386,298 | A | 1/1995 | Bronnenberg et al. |
| 5,446,557 | A | 8/1995 | Haze |
| 5,455,687 | A | 10/1995 | Fukui et al. |
| 5,473,691 | A | 12/1995 | Menezes et al. |
| 5,479,269 | A | 12/1995 | Bronnenberg et al. |
| 5,497,319 | A | 3/1996 | Chong et al. |
| 5,798,771 | A | 8/1998 | Nishii et al. |
| 5,949,858 | A | 9/1999 | Remensperger |
| 6,023,478 | A | 2/2000 | Kilk et al. |
| 6,266,160 | B1 | 7/2001 | Saito et al. |
| 6,330,628 | B1 | 12/2001 | Motoyama |
| 6,369,915 | B1 | 4/2002 | Yoshida |
| 6,587,219 | B1 | 7/2003 | Saito et al. |
| 6,608,694 | B1 | 8/2003 | Akimoto |
| 7,218,423 | B2 * | 5/2007 | Fujiwara ..................... 358/434 |
| 2002/0035576 | A1 * | 3/2002 | Kishimoto et al. .......... 707/200 |
| 2002/0059383 | A1 * | 5/2002 | Katsuda ...................... 709/206 |
| 2002/0156923 | A1 * | 10/2002 | Tanimoto .................... 709/246 |
| 2003/0020959 | A1 * | 1/2003 | Henry ......................... 358/402 |
| 2005/0275871 | A1 * | 12/2005 | Baird et al. ................. 358/1.15 |

* cited by examiner

Primary Examiner—Houshang Safaipour

(57) ABSTRACT

Recent years have witnessed emergence of a new family of imaging devices known as digital-image senders. These devices allow users to digitally scan a hardcopy document, and send the resulting digital image data via a communications network to other devices on the network. One problem that the present inventors recognized with these devices is that they do not provide a convenient way for users to add user-specific information to the images they send. Accordingly, the inventors teach, among other things, an exemplary method that includes providing image data, determining an identity of a user associated with a communications device, and defining a modified version of the image data, based on the determined identity of the user.

17 Claims, 3 Drawing Sheets

CHANGING IMAGES IN DIGITAL-IMAGE SENDERS

TECHNICAL FIELD

The present invention concerns stand-alone imaging systems, particularly digital-image senders.

BACKGROUND

The facsimile (or fax) machine, a descendant of telegraphic imagers devised in the 1840s, first ascended to widespread use in the 1980s and today stands along side the telephone as a common, if not essential, tool of daily commerce. Recent years have witnessed the marriage of the fax machine to computer networking technology, such as the Internet, to define a new family of imaging devices—known as digital-image senders. These devices allow users to scan a hard copy of a document, and send the resulting digital image data via a communications network to any capable receiving device on the network.

One problem that the present inventors recognized with these devices is that they do not provide a convenient way for users to add user-specific information to an image sent by these digital image senders. In fact, conventional digital-image senders generally require users to actually change the hardcopy images before scanning if they want to make changes, such as adding personalized notes and other information.

Accordingly, the present inventors have recognized a need for digital-image senders that provide users convenient options for changing or editing image data prior to sending.

DETAILED DESCRIPTION OF EXEMPLARY EMBODIMENT(S)

This description, which references and incorporates the above-identified figures and the appended claims, describes one or more specific embodiments of one or more inventions. These embodiments, offered not to limit but only to exemplify and teach the one or more inventions, are shown and described in sufficient detail to enable those skilled in the art to implement or practice the one or more inventions. Thus, where appropriate to avoid obscuring the one or more inventions, the description may omit certain information known to those of skill in the art.

The description includes many terms with meanings derived from their usage in the art or from their usage within the context of the description. As a further aid, the following term definitions are presented: The terms "a" and "an" both refer to at least one. And, the term "or" is used in its Boolean logical sense, unless used as a correlative conjunction with "either."

Figure 1:
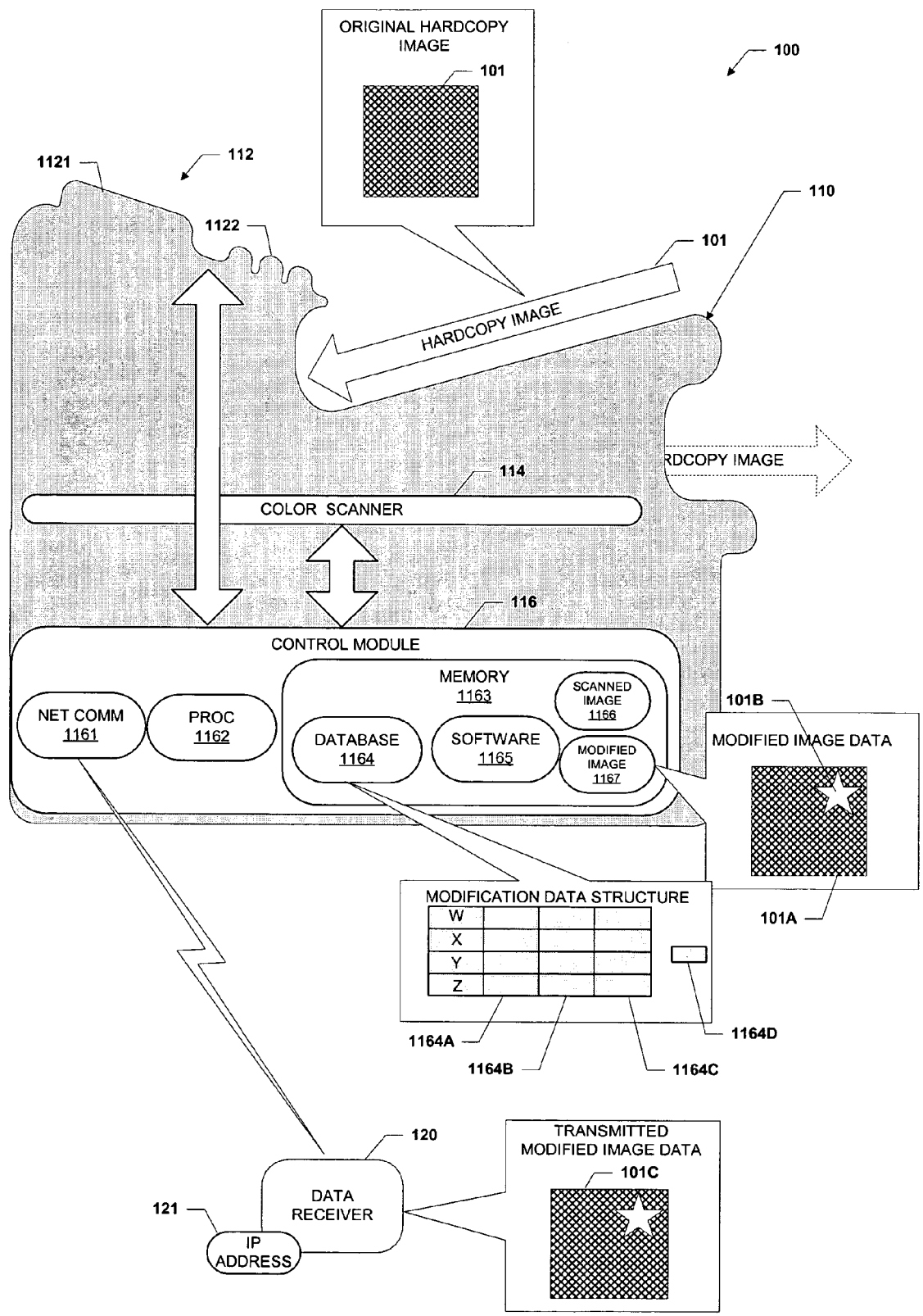
FIG. 1 is a block diagram of an exemplary system 100 corresponding to one or more embodiments of the present invention.

FIG. 1 shows an exemplary system 100 incorporating teachings of the present invention. System 100 includes a digital-image sender 110 and a digital-data receiver 120.

Digital-image sender 110, which is shown with a hardcopy document or image 101, includes a control panel 112, a scanner 114, and a control module 116. In the exemplary embodiment, digital-image sender 110 takes the form of an HP 9100c series digital sender from Hewlett Packard Company of Palo Alto, Calif. In some other embodiments, the digital-send capability is provided in the context of an all-in-one or multi-function peripheral (MFP), which also provides printing, coping, scanning, and faxing capabilities. Examples of such devices include HP LaserJet 4100 mpf and 9000 mpf systems from Hewlett Packard Company. (HP, 9100c, LaserJet, 4100 mpf and 9000 mpf are trademarks of the Hewlett Packard Corporation.) Still other embodiments of the invention use other types of devices with digital-sending capabilities, for example, devices that allow emailing of files or documents. In one such embodiment, the device is a personal computer or digital workstation.

More particularly, control panel 112 includes a display 1121 and a keyboard or touch-sensitive display 1122. Control panel 112 can also include other conventional features such as a point-and-click mechanism, lightness-darkness controls, and so forth, which are not shown. Control panel 112 is coupled to scanner 114 through control module 116.

Scanner 114, which is accessible via a lid assembly or an automatic document feeder (ADF) (not shown), digitizes documents. In the exemplary embodiment, scanner 114 scans in color. Scanner 114 as well as control panel 112 is coupled to control module 116.

Control module 116 includes, among other things, a network communications device 1161, a processor (or controller) 1162, and a memory 1163. Network communications device 1161 provides a capability to communicate over a communications network, using, for example, a 10 Base-T, Token Ring, or 10/100 Base-TX protocol.

Processor or controller 1162, which may take the form of dedicated processor or one or more application-specific, integrated circuits (ASICs), provides computing and data-processing capabilities for operating and controlling various components of digital-image sender 110 in accordance with one or more programs and data in memory 1163 (or elsewhere).

Memory 1163 includes, among other things (not shown), database 1164, software 1165, scanned image data 1166, and modified scanned image data 1167. Memory 1163 can be volatile or non-volatile and take one or more available form (s), including electronic, magnetic, or optical media.

Database 1164, which can be a local or link to a remote database, stores data for each authorized user W, X, Y, Z, etc., of digital-image sender 110. The stored data for each authorized user includes identification data 1164A, authentication data 1164B, post-scan-image (more generally file) modification (or signature) data 1164C. Database 1164 also includes machine-identification data 1164D for digital-image sender 110.

In the exemplary embodiment, identification data 1164A includes a user name or identifier, and authentication data 1164B includes a password. Post-scan modification data 1164C includes data or machine-executable instructions for use in automatically or selectively modifying the contents of scanned image data (more generally image files) to identify the user or other user- or machine-related information. The modification data also includes data or instructions indicating when and how the modification data is to be used during operation of digital-image sender 110. Machine-identification data 1164D includes a local device or network name, Internet Protocol (IP) address, or Machine-Access-Control (MAC) address for digital-image sender 110.

Software 1165 includes machine-readable or executable instructions or program code for causing processor 1162 (or other portions of digital-image sender 110) to authenticate the identity of a user and receive scanned image data 1166 based on a hardcopy document, such as hardcopy document 101. The software then causes the processor to modify the received scanned imaged data based on identity-related data for a user in database 1164 to produce modified scanned image data 1167. FIG. 1 illustrates this as image data 101A, which includes one or more modification features 101B. Subsequently, the modified scanned image data is sent via network communications device 1161 to one or more data receivers, such as data receiver 120.

Digital-data receiver 120, which is shown as having received a copy 101C of modified scanned image data 101A, can take the form of virtually any network appliance. Exemplary forms include a network facsimile machine, a desktop or notebook computer, a personal digital assistance (PDA), and mobile telephone. In the exemplary embodiment, data receiver 120 has an associated IP address 121.

In some embodiments, data receiver 120 comprises multiple devices. These may include digital-image sender 110 if it provides an image- or data-receiving capability. Such an arrangement would allow changing the original hard copy image 101 and then storing or printing the changed image on or from the image sender itself in addition to sending it to other networked data receivers.

Figure 2:
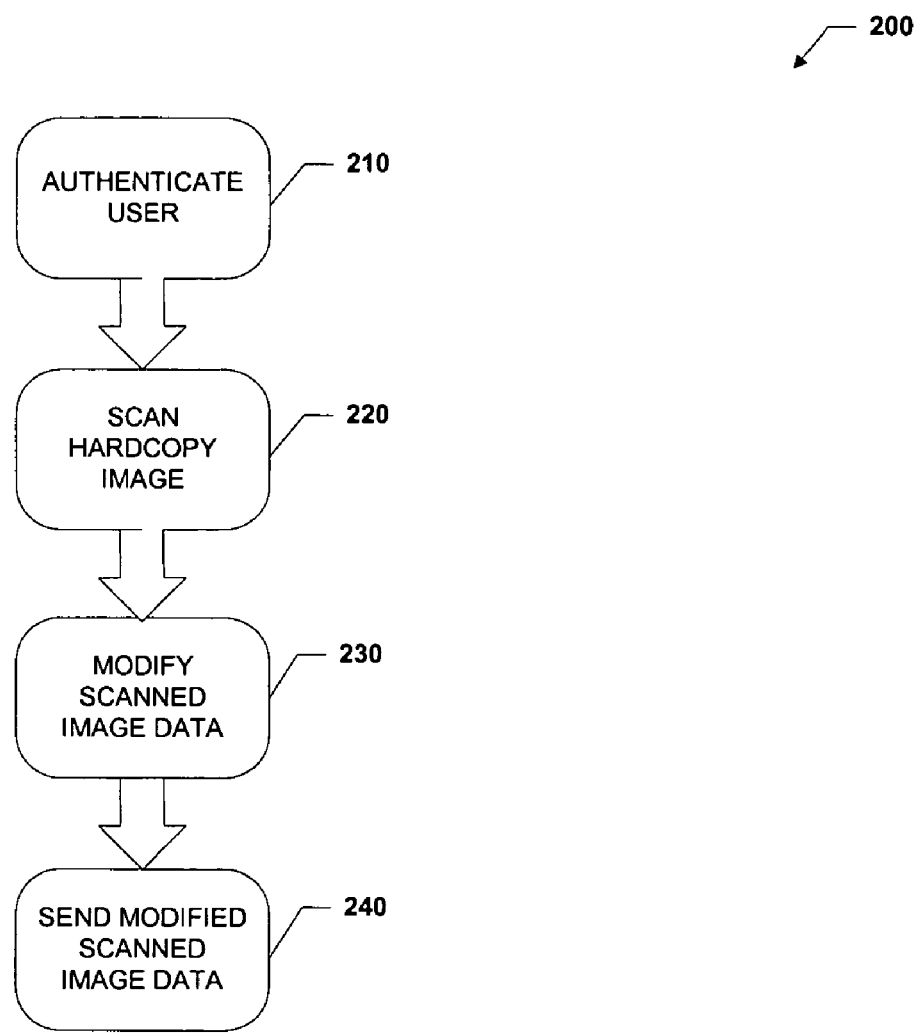
FIG. 2 is a flow chart of an exemplary method corresponding to one or more embodiments of the present invention.

FIG. 2 shows a flow chart 200 of one or more exemplary methods at least partly embodied within control module 116 (specifically software 1165) and executed by processor 1162 and other relevant portions of system 100. Flow chart 200 includes blocks 210-240, which are arranged and executed serially in the exemplary embodiment. However, other embodiments may reorder the blocks, omit one or more blocks, combine two or more blocks, or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, this and other exemplary process flows articulated in this document are applicable to software, firmware, hardware, and other types of implementations.

In block 210, the exemplary method begins with identifying a user of the system. In the exemplary embodiment, this identification entails receiving user identification and authentication information from a user via control panel 112 in FIG. 1. However, some embodiments allow a user at another device, such as a personal or laptop computer or MFP with a touch-screen, to enter this data via a graphical-user interface feature, such as a print-command window. Other embodiments may determine user identity based on credentials entered to log onto a computer network or to access an email account. Still other embodiments use biometric identification or proximity-based identification alone or in combination with login or other types of identification methods. Exemplary execution continues at block 220.

Block 220 entails providing digital image data to digital-image sender 110. In the exemplary embodiment, this entails scanning a hardcopy document and providing at least a portion of the resulting scanned image data. Exemplary formats for the scanned image data include: Bitmap (BMP), Joint Photographic Experts Group (JPEG), tagged image file format (TIFF), M-TIFF (Multiple TIFF), and Portable Document Format (PDF.)

Some embodiments may provide the digital image data via user selection of an image file from a file-directory structure to be an attachment to an email message or form for data transfer. In yet other embodiments, providing digital image data entails providing a non-image file, such as a text file, and converting the text file to an image (or graphics) file. In this case, providing the non-image file can entail selection of the file to be an email attachment. In still other embodiments, optical-character-recognition is used to convert an image file to a non-image file, such as a text file or combination text-and-graphics file. In any event, after providing the digital image data, execution proceeds to block 230.

Block 230 entails modifying the provided digital image data to create or define a modified version of the digital image data. In the exemplary embodiment, this modification entails retrieving from database 1164 modification data associated with the user identified and authenticated at block 210 and modifying the provided digital image data (or a copy of the provided image data) based on the retrieved modification data.

Some embodiments retrieve the modification data contingent on a decision block which entails checking whether modification data (relevant to the given user) is available within a local database, and if none is available, checking a predetermined or dynamically determined remote database. Variations of such embodiments check one or more flags or other indicators regarding user-, group-, or other type modification preferences or criteria. The preferences may be as simple as an affirmative indication to modify the image based on designated modification data, or as complex as a set of preferential rules specifying under what circumstances to modify and what modification data to use under those circumstances. In some cases, the modification preferences or criteria are determined before initiation of a scanning-sending session, while in others they are in whole or in part determined or received directly or indirectly from a user during the session. The modification preferences may include a designation of the source of the modification data, for example as a URL for a specific file on a local or remote database.

In some embodiments, the modification data includes one or more macros (or other forms of machine-executable modification instructions) and corresponding data for adding text, images (such as special graphical effects, borders, etc.), watermarks, barcodes, signature blocks, or combinations of these or other features to the provided digital image data. (The modifications can be made using bitmap or vector based manipulation of the original image data.) In one embodiment, the instructions cause issuance of an audible or visual prompt at the control panel for the user to enter a specific text message via the keypad or select from a set of user-, administrator-, or manufacturer-defined modifications, such as text messages. Variations of this embodiment may accept voice commands or perform speech-to-text conversion. In some other embodiments, the modification instructions cause an optical-character-recognition (OCR) function to process all or part of the image data and produce a textual result that is used by other portions of the macro to modify the file based on the OCR text.

Figure 3:
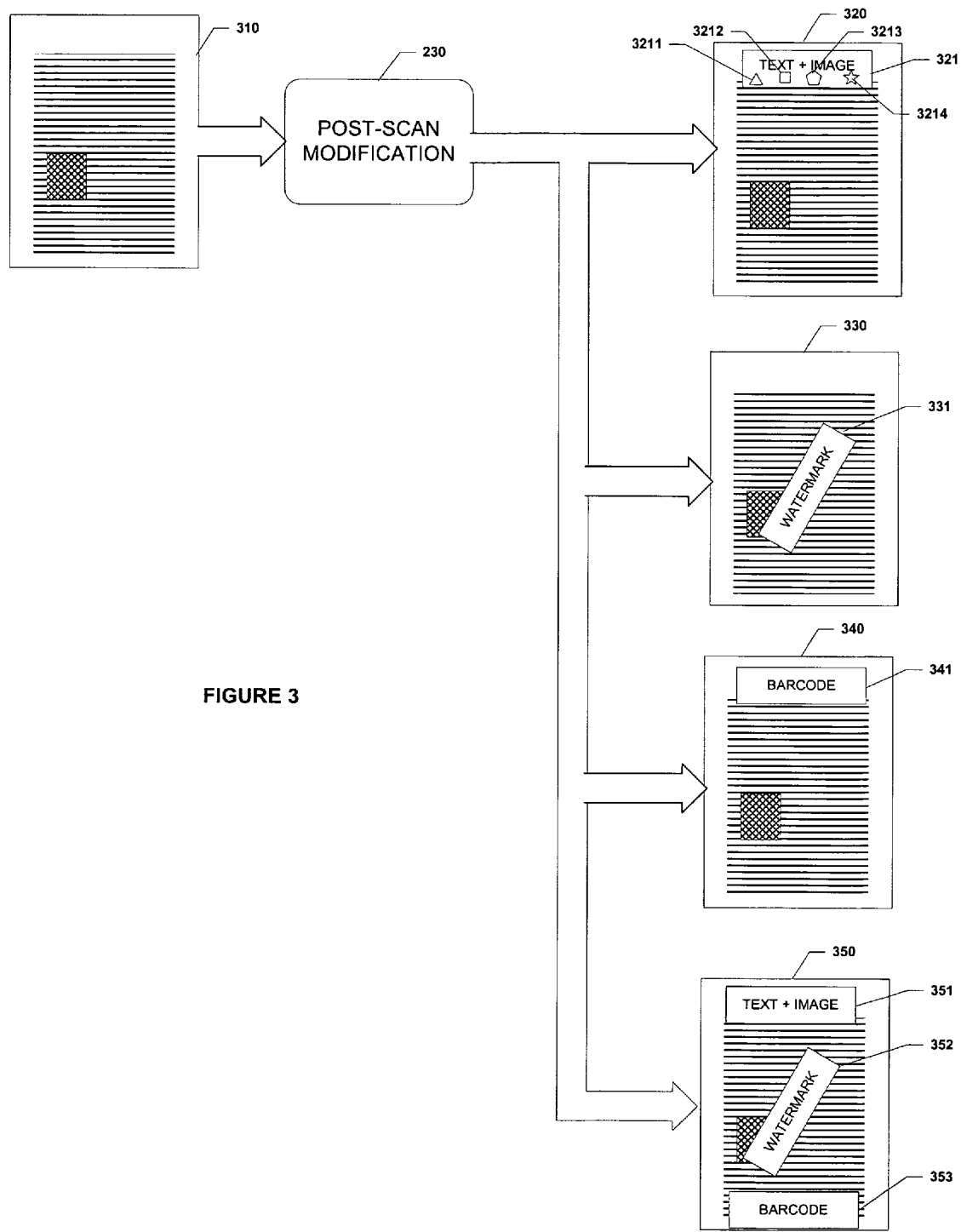
FIG. 3 is a schematic corresponding to one or more embodiments of the present invention.

FIG. 3 shows, in conceptual form, digital image data 310 as an input to modification block 230 and modified versions 320, 330, 340, and 350 as exemplary outputs. Modified version 320 includes modification information in the form of a header (or footer) 321 on one or more pages or other subportions of image data 310. Some embodiments present the contents of the header as a separate preface or appendix in addition to presenting one or more portions of the header on each or every other pages of the image data.

More particularly, header 321 includes a sender-identifying portion 3211, a group-identifying portion 3212, a sender-message portion 3213, and a machine-related portion 3214.

In the exemplary embodiment, sender-identifying portion, which is based on identification data 1164A in FIG. 1, includes a name (or alias) of the identified user (presumed sender), corresponding contact or address information, and an indication that the identified user is the sender of the modified digital image data. For example, the sender-identifying portion can include a message, such as "Sent by Bob," or "From Bob Sesek." Some embodiments include specific contact information for the sender, such as email addresses and phone numbers.

Group-identifying portion 3212 includes a name or logo for an organization or company associated with the identified user. Sender-message portion 3213 includes a message from the sender, such as "please review this document and phone me with your comments." In some embodiments, the message includes indications of confidentiality, proprietary rights, distribution restrictions, document-revision status. In addition or as an alternative to this information, some embodiments add graphical content, such as company logos, borders, etc.

Machine-related portion 3214 includes a name or a globally or locally unique identifier, such as an IP (Internet Protocol) or MAC (Media Access Control) address, hostname, network location, URL, or other type of network or machine identifier. In some embodiments, this portion also includes a date stamp and page-number information, such as total number of pages or an assigned page number for the corresponding page.

Modified version 330 includes modification information in the form of a watermark 331, which includes all or part of the content described for header 321. In the exemplary embodiment, the watermark is readily detectable by human readers. In some embodiments, the watermark may be invisible to the naked eye and thus requires use of special viewing or detection equipment. One example of an invisible watermark is a pattern of yellow dots similar to that used for anti-counterfeiting technology.

In modified version 340, the modification information takes the form of barcode 341. In the exemplary embodiment, the barcode is a two-dimensional barcode; however, other embodiments can use one-dimensional barcodes. In some embodiments, the barcode is embedded or distributed throughout the modified version.

In modified version 350, the sender information takes the form of a header 351, a watermark 352, and a barcode 353. In the exemplary embodiment, this header, watermark, and barcode include the same sender information. However, in other embodiments, the header includes the sender-identifying portion; the watermark includes the group-identifying portion; and the barcode includes the machine-identifying portion. Other embodiments can present various portions of the sender information in other ways and combination.

FIG. 2 shows that after modifying the digital image data in block 230, execution continues at block 240 with communication of the modified digital image data to a data receiver, such as data receiver 120 in FIG. 1. In the exemplary embodiment, this entails communicating the modified digital image data as an email or facsimile to an appropriate receiving device, such as an email or fax server. However, other embodiments can use other modes of data communication, such as file transfer protocol (FTP) or other Transport Control Protocol/Internet Protocol (TCP/IP) related protocols.

In some embodiments, communication of the modified digital image data to the data receiver may begin before completion of the modification. Also, some embodiments may divide a scanned imaged into components, determine based on the retrieved modification data which of the components are to be modified, and begin communicating the components that will not be modified before or during modification of other components.

CONCLUSION

The embodiments described in this document are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A method comprising:
   providing digital image data;
   determining an identity of a user associated with a communications device; and defining a modified version of the provided digital image data, based on the determined identity of the user,
   wherein defining the modified version of the provided digital image data, based on the determined identity of the user, comprises:
      retrieving image-modification data from a database, based on the determined identity;
      defining the modified version of the provided image data based on the retrieved image-modification data;
      changing the image data to indicate identity of the user; and
      changing the image data to include a watermark.

2. The method of claim 1, wherein providing the image data, comprises: scanning a hardcopy document to produce the digital image data.

3. The method of claim 1, wherein providing the digital image data, comprises:
   receiving an image file for attachment to an email message.

4. The method of claim 1, wherein determining the identity of the user associated with the communications devices comprises accessing network login data associated with a device coupled to a communication network.

5. The method of claim 1, further comprising:
   accessing machine-identifying data in a memory associated with the communications device;
   wherein defining the modified version of the provided digital image data, based on the determined identity of the user includes defining the modified version based on the accessed machine-identifying data.

6. The method of claim 1, wherein determining the identity of the user comprises
   receiving data via a control panel of the communications device.

7. The method of claim 1, wherein the watermark is normally visible when rendered by a printing device.

8. The method of claim 1, further comprising communicating the modified version of the provided image data to a digital data receiver.

9. A machine-readable medium comprising instructions for:
   determining an identity of a user associated with a communications device; and
   defining a modified version of scanned image data, based on the determined identity of the user,
   wherein defining the modified version of the scanned image data, based on the determined identity of the user, comprises:

retrieving image-modification data from a database, based on the determined identity;

defining the modified version of the scanned image data based on the retrieved image-modification data;

changing the image data to indicate identity of the user; and changing the image data to include a watermark.

10. The medium of claim 9, wherein the medium is electronic, magnetic, or optical.

11. A method comprising:

changing scanned image data associated with a hardcopy document, based on user-identity data associated with a digital image sender, wherein changing scanned image data associated with the hardcopy document, based on identity data associated with the digital image sender, comprises:

determining identity of a user of the digital image sender, based on network login information for the user;

retrieving image-modification data from a database, based on the determined identity;

changing the scanned image data based on the retrieved image-modification data; and changing the scanned image data to include information indicating identity of the user and a time.

12. The method of claim 11, wherein changing scanned image includes changing the scanned image data to include information indicating identity of the image sender.

13. The method of claim 11, wherein changing scanned image data based on the retrieved image-modification data, comprises changing the scanned image data to include one or more of a barcode, a watermark, and a header, with the included barcode, watermark, or header indicating identity of the user.

14. An apparatus comprising:

a scanner;

a control panel; and a control module coupled to the scanner and the control panel, the control module including:

a processor; and a storage medium coupled to the processor including instructions for:

determining an identity of a user associated with the apparatus; and defining a modified version of scanned image data from the scanner, based on the determined identity of the user wherein defining the modified version of the scanned image data, based on the determined identity of the user, comprises:

retrieving image-modification data from a database, based on the determined identity:

defining the modified version of the scanned image data based on the retrieved image-modification data changing the image data to indicate identity of the user: and changing the image data to include a watermark.

15. The apparatus of claim 14, further including a network communications device for communicating the modified version of the scanned image data using a network communications protocol.

16. The apparatus of claim 14, wherein the instructions for determining identity of a user of the apparatus, include instructions for determining identity of the user based on network login information for the user.

17. An apparatus comprising:

a scanner;

a control panel;

a control module coupled to the scanner and the control panel, the control module including:

means for determining an identity of a user associated with the apparatus; and means for defining a modified version of scanned image data from the scanner, based on the determined identity of the user wherein the means for defining the modified version of the scanned image data is further for:

retrieving image-modification data from a database, based on the determined identity:

defining the modified version of the scanned image data based on the retrieved image-modification data;

changing the image data to indicate identity of the user; and changing the image data to include a watermark.

* * * * *